United States Patent [19]

Flebbe

[11] Patent Number: 4,843,871

[45] Date of Patent: Jul. 4, 1989

[54] METHOD AND APPARATUS FOR RECEIVING A TIRE

[75] Inventor: Werner Flebbe, Neustadt a. Rbg., Fed. Rep. of Germany

[73] Assignee: Continental Aktiengesellschaft, Hanover, Fed. Rep. of Germany

[21] Appl. No.: 245,822

[22] Filed: Sep. 16, 1988

[30] Foreign Application Priority Data

Sep. 23, 1987 [DE] Fed. Rep. of Germany ....... 3731925

[51] Int. Cl.⁴ ............................................ G01M 17/02
[52] U.S. Cl. .............................. 73/146; 152/DIG. 20
[58] Field of Search ................................. 73/146, 7, 8; 152/DIG. 20; 157/1, 1.1, 1.35

[56] References Cited

U.S. PATENT DOCUMENTS 4,563,042  1/1986  Seitz et al. ................... 152/DIG. 20
4,630,662  12/1986 Howind ....................... 152/DIG. 20

FOREIGN PATENT DOCUMENTS 3541188  5/1987  Fed. Rep. of Germany ........ 73/146
3604023  8/1987  Fed. Rep. of Germany ........ 73/146

Primary Examiner—Donald O. Woodiel
Attorney, Agent, or Firm—Becker & Becker, Inc.

[57] ABSTRACT

A method and apparatus for receiving a tire, especially for checking the concentricity of a pneumatic vehicle tire that during operation has its bead portions mounted on the radially inner periphery of a wheel rim. A test rim is provided that comprises two axially movable rim ring sections that in turn are provided with pivotable rim flange segments toward which cooperating parts are axially movable from beyond the tire. The bead zones of the trapezoidally mounted tire are engaged by the cooperating parts and are brought into the rim-setting position. The pivotable rim flange segments are swung radially inwardly, so that the bead portions are held between the cooperating parts and the rim ring sections. The bead seat is sealed by sealing lips.

10 Claims, 1 Drawing Sheet

METHOD AND APPARATUS FOR RECEIVING A TIRE

BACKGROUND OF THE INVENTION

The present invention relates to a method and apparatus for receiving a tire, especially for measuring or checking the concentricity of a pneumatic vehicle tire that during operation has its bead portions mounted on the radially inner periphery of a wheel rim. A test rim is provided that comprises two axially movable rim ring sections, with the tire that is to be checked being manufactured with trapezoidally axially outwardly directed sidewalls, and with the tire being disposed on the test rim in this trapezoidal form.

The concentricity of conventional tires, the beads of which are disposed on the radially outer periphery of the rim, is checked by means of a two-part test rim that is disposed against the tire from the outside. In so doing, the two test rim parts that are axially movable relative to one another receive the tire on bead-setting surfaces in the same manner as the vehicle tire is mounted during driving operation. With the newly developed tire/rim system, such as disclosed in German Offenlegungsschrift No. 30 00 428, where the beads of the tire are disposed on the radially inner periphery of the rim, the problem exists that the test rim must be introduced into the interior of the tire, although it has a greater diameter than the inner diameter of the tire.

To accomplish this, it was proposed in German Offenlegungsschrift No. 35 41 188 to construct the axially displaceable rim ring sections of several radially adjustable rim segments. In the radially drawn-together state, i.e. with a reduced diameter, such a test rim can be introduced into the tire, which has a smaller inner diameter, and can then be moved apart into the checking position. However, the problem with this is that the interior of the tire must be sealed off and the sidewalls of the tire must be moved out of their trapezoidal form, in which they are heated, into the mounting state.

For this purpose, German patent application P 36 04 023.1 proposes checking the concentricity of such a tire in the position where its sidewalls and bead regions are folded laterally outwardly, i.e. in the position in which the tire is vulcanized. However, with such an apparatus the actual operating conditions can be reproduced only to a limited extent, and one is still left with the desire to be able to check tires in their actual mounting position.

It is therefore an object of the present invention to provide a method and apparatus with which a tire of the aforementioned type can be easily brought into the mounting position and can be checked.

BRIEF DESCRIPTION OF THE DRAWING

This objection, and other objects and advantages of the present invention, will appear more clearly from the following specification in conjunction with the accompanying schematic drawing, in which.

SUMMARY OF THE INVENTION

The method of the present is characterized primarily in that the axially movable rim ring sections are provided with pivotable rim flange segments, cooperating parts are moved from beyond the tire axially in a direction toward the rim flange segments, the bead zones of the trapezoidally mounted tire are engaged by the cooperating parts, and the pivotable rim flange segments are swung radially inwardly, so that the bead portion and their bead zones are brought into a rim-seating position between the cooperating parts on the one hand and the rim ring sections on the other hand.

As a result of these measures, a method is provided with which tires of the aforementioned type can be quickly and rapidly brought into their mounting position and can be checked.

The apparatus of the present invention for carrying out the inventive method is characterized primarily in that the axially movable rim ring sections are provided with pivotable rim flange segments.

As a result of these measures, an apparatus is provided with which a trapezoidally heated tire can be rapidly and easily brought into the rim-seating position. This apparatus is easy to seal off, and it can be used to check a large number of tires within a very short period of time.

Further specific features of the present invention will be described in detail subsequently.

DESCRIPTION OF PREFERRED EMBODIMENTS

Figure 1:
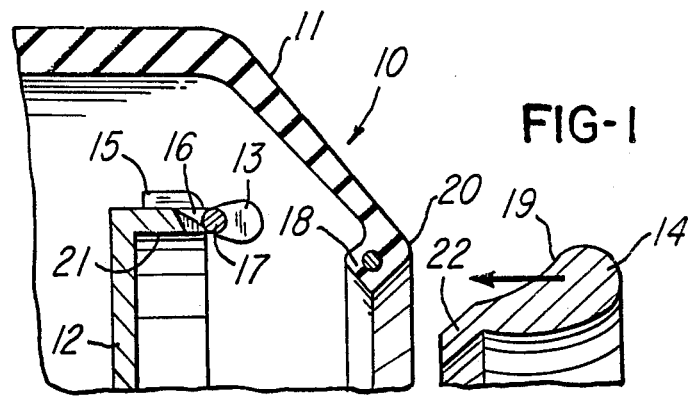
FIG. 1 is a cross-sectional view of part of one exemplary embodiment of the invention concentricity-checking apparatus showing one rim ring section with rim flange segments pivoted up, and one cooperating part, prior to mounting.
Figure 2:
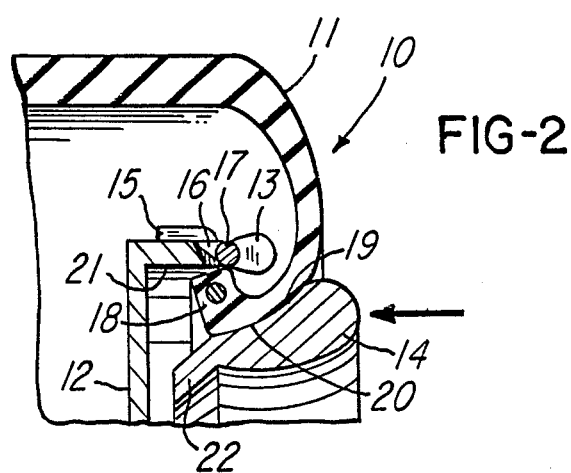
FIG. 2 shows the apparatus of FIG. 1 during the mounting process.
Figure 3:
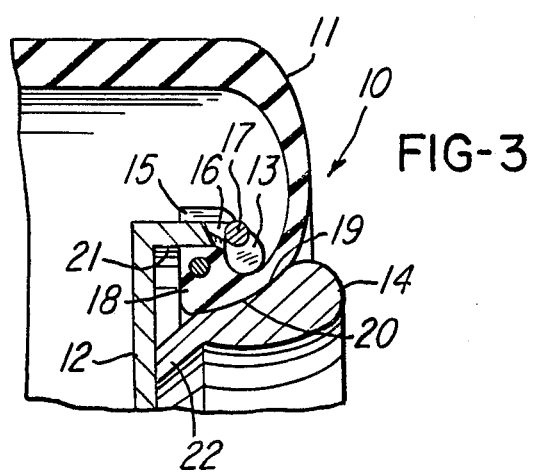
FIG. 3 shows the checking apparatus of FIG. 1 with the rim flange segments pivoted, the cooperating part moved against the rim ring section, and the tire in a rim-seating position.

Referring now to the drawing in detail, the concentricity-checking apparatus illustrated in FIGS. 1 to 3 essentially comprises two rim ring sections 12 that can be moved axially relative to one another. Each of the rim ring sections 12 is provided with rim flange segments 13. For mounting or removal of the tire 11, the rim ring sections 12 can be moved axially to provide the respectively desired open rim width. In this connection, the bead portion 18 of the tire 11 is deformed ovally and is placed in its trapezoidal form over the concentricity-checking apparatus 10.

After the rim ring sections 12 have been moved apart to the desired open rim width, a respective cooperating part 14 is moved against the pertaining bead zone 20 of the tire 11 from beyond the tire.

The cooperating parts 14 are provided with support surfaces 19 for receiving the bead zones 20 of the tire 11. As shown in FIG. 2, these support surfaces 19 press the bead portions 18 into a rim-seating position against the bead seat 21 on the radially inner periphery of the rim ring section 12.

The rim flange segments 13 can be turned about swivel joints 17 in an axis-parallel manner. As shown in FIG. 3, for this purpose shift mechanisms 15 are provided that turn the rim flange segments 13 via shift levers 16 out of a horizontal position into a radially inwardly directed position. For this purpose, the rim ring sections 12 are provided with a plurality of rim flange segments 13. Since the spacing gaps between the rim flange segments 13 are disposed within the tire 11, no sealing problems occur. The support surfaces 19 seal the interior of the tire 11 against the bead zones 20, with sealing lips 22 being provided to enhance the sealing effect. The sealing lips 22 are associated with the cooperating parts 14 and seal the latter relative to the rim ring sections 12.

To remove the tire 11, the cooperating parts 14 are again moved axially apart, and the rim flange segments 13 are pivoted back into a horizontal position. The bead portions 18 are thereby freed, and the tire 11 can be removed from the concentricity-checking apparatus 10.

The present invention is, of course, in no way restricted to the specific disclosure of the specification and drawing, but also encompasses any modifications within the scope of the appended claims.

What I claim is:

1. A method for receiving a tire, especially for checking the concentricity of a pneumatic vehicle tire that during operation has its bead portions mounted on the radially inner periphery of a wheel rim, said method including the use of a test rim comprised of two axially movable rim ring sections, with said tire that is to be checked being manufactured with trapezoidally axially outwardly directed sidewalls, and with said tire being disposed on said test rim in this trapezoidal form, said method further including the steps of:

providing said axially movable rim ring sections with pivotable rim flange segments;
providing respective cooperating parts;
moving said cooperating parts from beyond said tire axially in a direction toward said rim flange segments such that each of said cooperating parts engages a bead zone of said trapezoidally mounted tire and folds over one of said tire sidewalls; and
swinging said rim flange segments radially inwardly to thereby dispose said bead portions and bead zones between said cooperating parts on the one hand, and said rim ring sections on the other hand, in a rim-seating position.

2. A method according to claim 1, which includes the step of providing sealing lips to seal off the bead seats.

3. In an apparatus for receiving a tire, especially for checking the concentricity of a pneumatic vehicle tire that during operation has its bead portions mounted on the radially inner periphery of a wheel rim, said apparatus including a test rim comprised of two axially movable rim ring sections, with said tire that is to be checked being manufactured with trapezoidally axially outwardly directed sidewalls, and with said tire being disposed on said test rim in this trapezoidal form, the improvement wherein:

said axially movable rim ring sections are provided with pivotable rim flange segments.

4. An apparatus according to claim 3, which further includes two axially movable cooperating parts, each of which is movable from beyond a tire toward one of said rim ring sections to engage a bead zone of said trapezoidally mounted tire and fold over one of said tire sidewalls, with said cooperating parts being provided with seating surfaces to receive outer portions of said bead zones, whereby said bead portions and said bead zones are adapted to be disposed between said cooperating parts on the one hand, and said rim ring sections on the other hand.

5. An apparatus according to claim 4, in which each of said rim ring sections has a radially outer periphery that is provided with shift mechanism means for swinging said rim flange segments out of a radially and axially outer position into an axially and radially inner position.

6. An apparatus according to claim 5, in which shift levers are associated with said shift mechanism means.

7. An apparatus according to claim 5, in which said cooperating parts are provided with sealing lips to effect a seal relative to said rim ring sections.

8. An apparatus according to claim 5, in which said cooperating parts are disposed radially inwardly of said rim flange segments.

9. An apparatus according to claim 5, in which said rim flange segments are disposed in an axis-parallel manner.

10. An apparatus according to claim 5, in which said rim ring sections are not split in the circumferential direction.

* * * * *